Sept. 4, 1956  G. ALLEN  2,761,485

WHEEL WITH TANGENTIAL SPOKES

Filed April 22, 1954

INVENTOR.
Gene Allen
BY
AGENT

2,761,485

WHEEL WITH TANGENTIAL SPOKES

Gene Allen, Los Altos, Calif., assignor to Gilbert Wheel, Inc., Portland, Oreg.

Application April 22, 1954, Serial No. 424,826

4 Claims. (Cl. 152—75)

This invention relates generally to wheels for automotive vehicles and more particularly to wheels of this general class in which the tire rim is resiliently attached to the axle hub through uniformly spaced spokes lying substantially tangential to the hub.

Reference is here made to wheels of this general type shown in U. S. Patents Nos. 2,628,651; 2,659,405; and 2,660,213 over which the present invention is an improvement.

As built and tested by the present applicant under license from the owner of the above listed patents, the wheels there shown have been found to have remarkable qualities resulting in saving of fuel and reduced tire wear. However, the wheels have been found difficult to reproduce with precision and also have been found to require more radial space between the hub and rim than is sometimes available.

Much time and money has been expended in the effort of discovering the reasons why the previous wheels have the desirable characteristics which they have and applicant believes he has been successful in this effort. The simplified wheel of this invention has been shown by test to have the desired characteristics.

It is the principal object of this invention to provide a wheel which is simple in construction and in which the driving force on the wheel rim is transmitted to the rim from the hub through column loading of spokes attached substantially tangentially to the hub and rim.

It is a second object to provide such a wheel having equally spaced spokes of flat bars of spring steel attached substantially to the hub and rim and having no other connection between the hub and rim.

It is a third object to provide such a wheel with two spaced pairs of lateral guides or supports for each of said spokes between its points of attachment to said rim and said hub and with one of said pairs secured to the wheel rim only and the other of said pairs secured to the wheel hub only.

It is a fourth object to provide such a wheel with a fulcrum bearing for said spoke on said hub near the position of attachment of said spoke to said hub and a fulcrum bearing of said spoke on said rim nearer the position of attachment of said spoke on said rim than the position of said fulcrum bearing for said spoke on said hub.

It is a fifth object to provide such a wheel with means for assuring firm contact between said spoke and said fulcrum bearings.

How these and other objects are attained is explained in the following specification referring to the attached drawing in which Fig. 1 is a fragmental view in partial section of the wheel of this invention.

Like numerals of reference refer to like parts in the several figures of the drawing.

Figure 1:
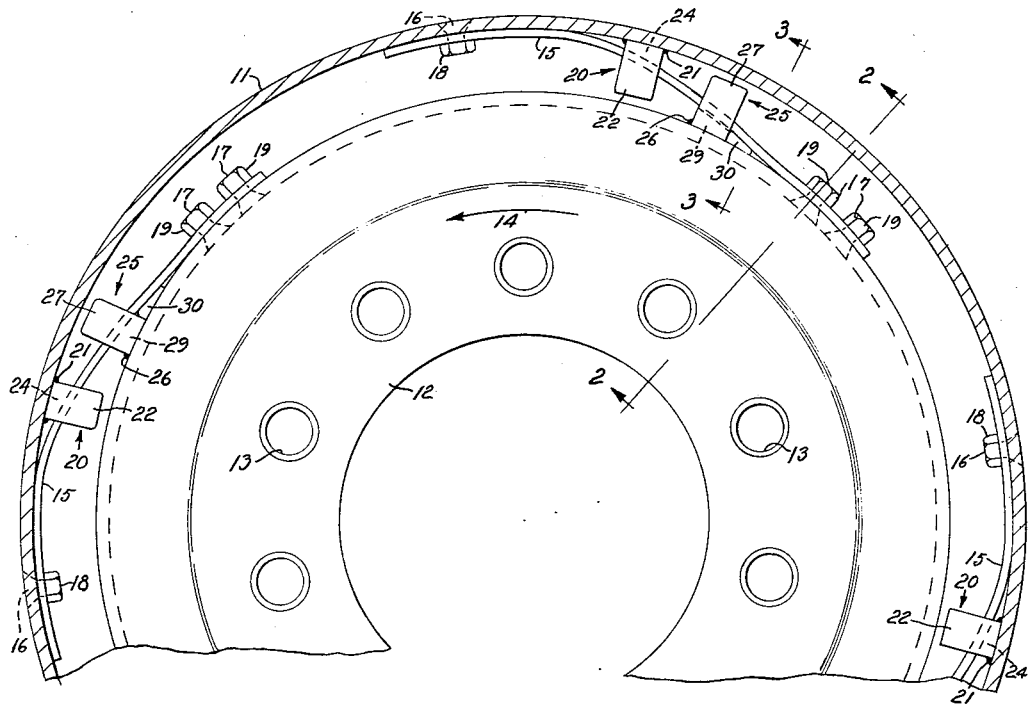
Figure 4:
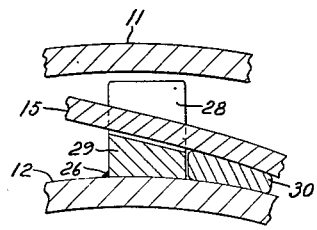
Fig. 4 is a fragmental sectional view along the line 4—4 of Fig. 3.
Figure 3:
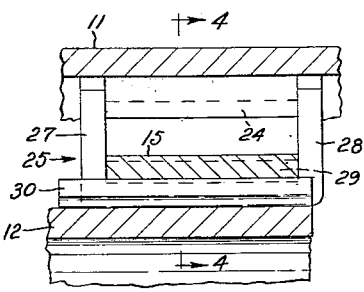
Fig. 3 is a fragmental view along the line 3—3 of Fig. 1.
Figure 2:
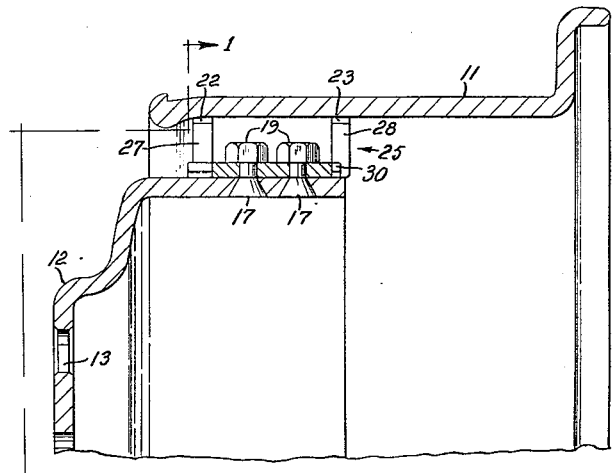
Fig. 2 is a fragmental sectional view along the line 2—2 of Fig. 1.

Referring now to the drawing there is shown at 11 a fragment of an automotive vehicle wheel rim adapted to receive a pneumatic tire thereabout and a supporting hub 12 for wheel 11. Hub 12 is adapted to be bolt connected through holes 13 to the axle bearing supporting hub of the vehicle. The direction of forward rotation of the wheel is shown by the arrow 14, it being understood that the wheels are made right hand and left hand for proper application to the two sides of the vehicle.

Equally spaced around the hub in the space between the hub and rim of the wheel are a desired or required number of flat bar tempered steel spokes 15. In the wheel shown the spacing is for a total of four spokes per wheel. Before heat treating the spokes are templet formed to the final shape shown.

At the outer end the spoke is held to the rim by a pair of carefully made and tempered alloy steel bolts 16 and nuts 18 through countersunk holes in the rim and reamed holes in the spoke. All bolt holes are carefully sized to fit the bolts closely. At the inner end the spoke is held to the rim by two pair of bolts 17 and nuts 19 like bolts 16 and nuts 18.

Before attaching spoke 15 to rim 11, U-shaped guiding clip and fulcrum bearing 20 is welded to the rim as at 21. Clip 20 has two spoke guiding legs 22 and 23 extending radially inwardly from the rim and connected by a back member 24 tapered to closely contact and fulcrum spoke 15 on rim 11.

Before attaching spoke 15 to hub 12, a U-shaped guiding clip 25 is welded to the hub as at 26. Clip 25 has two spoke guiding legs 27 and 28 extending radially outwardly from the hub and connected by a back member 29 tapered to clear spoke 15. Leg 28 is wider than leg 27 and the width of back member 29 is tapered from leg 27 to leg 28 as well as tapered in radial thickness in the circumferential direction.

After rim 11 with clip 20 attached and hub 12 with clip 25 attached are in their necessary relative positions, spokes 15 are placed in clips 20 and 25 and bolted to rim 11 and hub 12 as shown. Then hardened wedge 30 is driven into place between hub 12, spoke 15 and clip 25 to form a fulcrum for spoke 15 and hub 12 and thus finally assure a tight support for spoke 15 at all critical points. After being driven into position wedge 30 is tack welded at its ends to hub 12 to secure it against endwise movement. It should be understood that wedge 30 is laterally tapered to match the lateral taper of back member 29 of clip 25 as well as circumferentially tapered in radial width to mate solidly with spoke 15 and that the small end of wedge 30 is additionally tapered for easy starting when driven into place.

From an examination of the drawing it is clear that in use each of the spokes of the wheel are loaded by the weight on the axle with both longitudinal and transverse components of the total load. When stationary or freely rolling on the highway, without the application of driving torque to the hub, the load on the wheel is counteracted by compressive stresses in the spokes ahead of the vertical center line of the wheel and by tensile stresses in the spoke behind the vertical centerline of the wheel. The spokes are sensibly rigid but actually sufficiently resilient to rock slightly over their respective fulcrum bearing points of support to shift the axle loading to spokes in position to take the load longitudinally of the spoke in either tension or compression.

For instance in the four spoke wheel shown when two opposite spokes are parallel to the highway at the top and bottom of the wheel respectively and when the intermediate spokes are normal to the highway in front and back of the vertical centerline of the wheel respectively, it is seen that the forward vertical spoke carries half the axle load in compression and the rearward vertical spoke in tension carries the other half of the axle load on the wheel. In this position it is seen that the top and bottom horizontal spokes will carry no substantial part of the load but will be stressed sufficiently transversely to shift infinitesimally in sufficient amounts to adjust the load to the vertical spokes.

When driving torque is applied by the axle on hub 12 to drive hub 12 in the direction indicated by arrow 14, this driving torque will be applied tangentially by the hub, longitudinally compressively through the spokes and substantially tangentially to the rim. The result is that the compressive forces in the spokes have added to them the driving forces applied to the spokes and the tensile stresses in the spokes are reduced by the amount of the compressive driving stresses applied to the spokes loaded in tension. It is thus seen that the driving torque applied to the wheel does not change the vector sum of the loading of all the spokes but is effective to shift the vertical loading of the wheel ahead of its vertical center line. The effect of this forward shift of the vertical line of loading of the wheel is materially to reduce the scrubbing of the tire caused by the change in radius and the bulging at the point of road contact of a pneumatic tire. It is the above explained property of this improved wheel which results in lower fuel and tire costs in the operation of vehicles equipped with the wheels of this invention.

Having thus recited some of the objects of this invention, illustrated and described a typical structure by which the invention is practiced and explained its operation, I claim:

1. A wheel for automotive vehicles comprising a hub structure and an encircling rim structure uniformly radially spaced from said hub structure, together with three or more suspension units equally spaced about said hub structure securing said hub structure to said rim structure, each of said units comprising a substantially rigid spoke in the radial space between said hub structure and said rim structure, said spoke being secured at one end to said rim and at its other end to said hub substantially tangentially thereof, said rim structure including fulcrum means adapted to bear inwardly on said spoke near its rim attachment end, said hub structure including fulcrum means adapted to bear outwardly on said spoke near its hub attachment end and each of said units between its radially inwardly and outwardly bearing fulcrum positions consisting of a single strap of spring steel in a plane approximately tangential to said hub.

2. The wheel of claim 1 in which said spoke is formed of a single leaf of tempered spring steel.

3. The wheel of claim 1 in which said hub structure includes means intermediate the ends of said spoke for limiting the movement of said spoke axially of said hub and said rim structure includes means intermediate the ends of said spoke for limiting the movement of said spoke axially of said rim and said two movement limiting means being spaced intermediate the ends of said spoke.

4. The wheel of claim 1 in which one of said fulcrum means comprises a bearing wedge forced into place after the ends of said spoke have been secured to said hub structure and said rim structure for the purpose of pressing said spoke against the other of said fulcrum means.

References Cited in the file of this patent

UNITED STATES PATENTS

| | | |
|---|---|---|
| 2,628,651 | Gilbert | Feb. 17, 1953 |
| 2,659,405 | Gilbert | Nov. 17, 1953 |
| 2,660,213 | Gilbert | Nov. 24, 1953 |
| 2,697,467 | Giannotti | Dec. 21, 1954 |

FOREIGN PATENTS

| | | |
|---|---|---|
| 20,882 | Great Britain | 1914 |